P. P. STEWART.
Cooking Stove.
No. 2,915.
Reissued April 7, 1868.
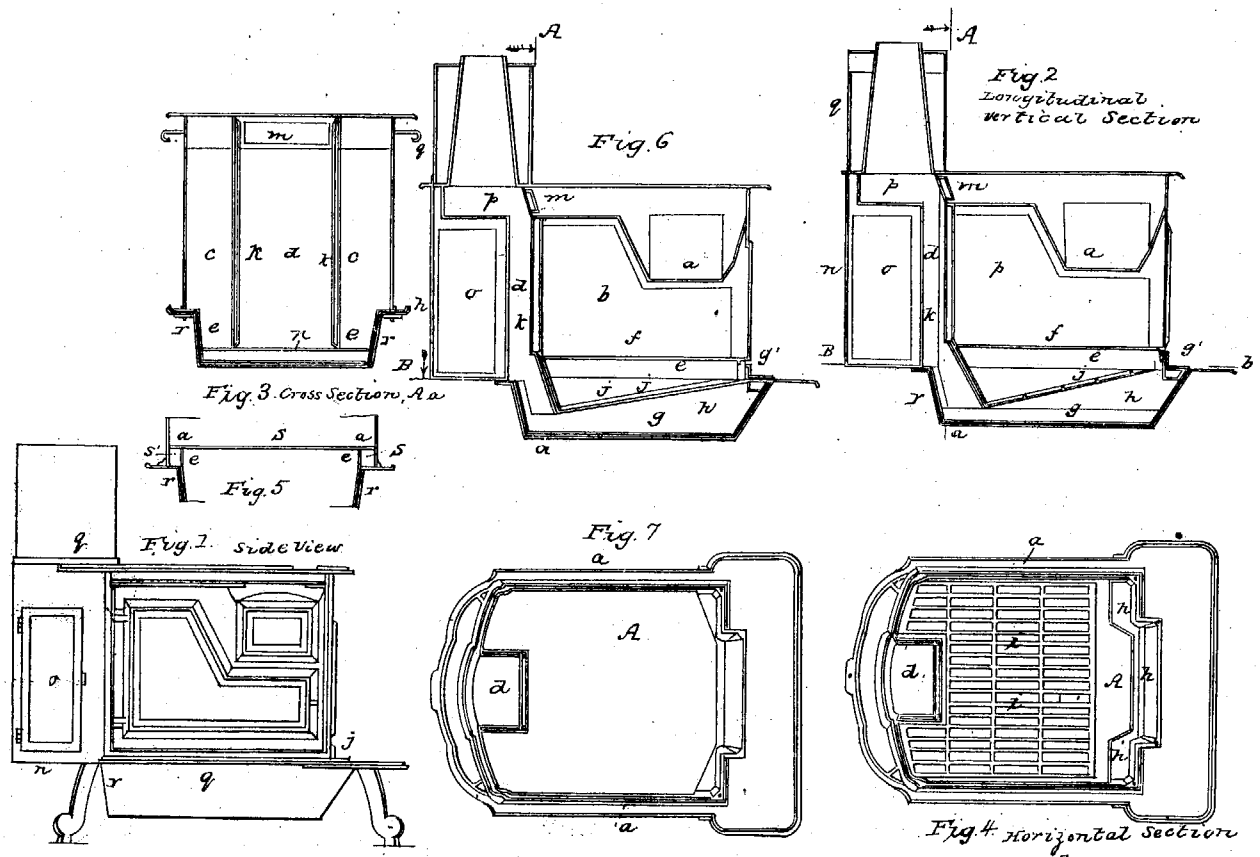
Witnesses
Marcus P. Norton
Charles D. Kellum
Inventor
Philo P. Stewart
N. PETERS, Photo-Lithographer, Washington, D. C.

United States Patent Office.

PHILO P. STEWART, OF TROY, NEW YORK.

*Letters Patent No.* 23,622, *dated April* 12, 1859; *reissue No.* 1,673, *dated May* 17, 1864; *reissue No.* 2,915, *dated April* 7, 1868.

IMPROVEMENT IN COOKING-STOVES.

The Schedule referred to in these Letters Patent and making part of the same.

TO ALL WHOM IT MAY CONCERN:

Be it known that I, PHILO P. STEWART, of the city of Troy, county of Rensselaer, and State of New York, have invented new and useful Improvements in Cooking-Stoves, for which Letters Patent of the United States of America were granted to me in due form of law, on the 12th day of April, 1859 which Letters Patent being found defective, in that the specifications and claims thereof were insufficient, and not as full as the same ought to have been, were duly surrendered, and a new patent was granted upon a corrected and amended specification, and claims were attached thereto which better protected my said invention and improvements; and now, in order for the more perfect protection of my said invention and improvements, and that I may the better defend the same from infringements, and thereby be enabled to have and to receive that fair and just remuneration provided by the law, in the manner as by law provided, I have found it necessary to correct, revise, and amend the specifications and claims of the same by a surrender and reissue thereof, as by law provided. Now, therefore, I do hereby declare that the following is a more full, clear, and exact description of the construction, arrangement, combinations, and operations of my said invention and improvements, reference being hereby had to the accompanying drawings, and to the letters of reference marked thereon and making a part thereof.

Like letters represent and refer to like or corresponding parts.

Figure 1 is a side elevation of the cooking-stove found upon sheet 2 of the accompanying drawings, which, for convenience, I have made upon three sheets, which are known respectively as "sheet 1," "sheet 2," and "sheet 3."

Figure 2, sheet 1, is a vertical section, lengthwise, through or near the centre of said stove.

Figure 3, sheet 2, is a cross vertical section, taken on a line, A *a*, of figs. 2 and 6 of sheets 1 and 3, respectively.

Figure 4 is a horizontal section, taken at the line B *b* of figs. 2 and 6 of sheets 1 and 3 of the accompanying drawings.

Figure 5 shows the side air-chambers, more fully described and set forth hereinafter.

It will here be observed that figs. 2 and 6 appear nearly the same as to lines and outlines. The object in these two figures is to show the fact that the flue-plate underneath the oven of the stove, and fully described and set forth hereinafter, may be raised, elevated, or depressed to and upon different angles or inclinations as the case may seem to require.

Figure 7, like fig. 4, contains and represents the flue-partition plate underneath the oven. At fig. 4 such plate is constructed so as to receive and contain any cement or non-conducting material, in the manner and for the purpose substantially as herein described and set forth, while such dividing-flue plate is at said fig. 7 represented as perfectly smooth and plain, in the manner hereinafter described.

Each and every part of my said invention and improvements represented at the different figures of the accompanying drawings will be more fully, at large, and in detail described and set forth hereinafter than hereinbefore.

My invention and improvements herein contained relate to what is known as the return-flue stove by reference to my former Letters Patent, originally granted and issued to me, bearing date the 18th day of January, 1859, in which the fire-chamber or chamber of combustion is placed or suspended in the front upper corner of the oven thereof, and the products of combustion or heated air pass in a sheet between the top or boiler-plate of the stove and the top of the oven or upper oven-plate, and, dividing, pass down two side vertical flues at and in the back of the stove; thence in a single sheet under the oven to the front part of the cooking-stove herein contained, around the front end of the flue-plate hereinafter described and set forth, back between this flue-plate and the bottom of the oven, and to the back part of the stove, and up to the centre-flue or flues, and up the same to the exit-pipe, which centre flue or flues are known as rising-flue or flues, and in the back end of the stove, and at the rear end of the oven, and, of course, between the outside or descending-flues, there being a passage directly from the top-flue over the upper end of the back rising-flue or flues, as the case may be, and controlled by a damper for the purpose of discharging the products of combustion or heated air directly to the chimney, when it may be desired not to heat the oven sufficient for baking purposes, or to hasten combustion of the fuel, in the manner substantially as described and set forth in my aforesaid Letters Patent, and in the reissues thereof.

I have found, by repeated experiments in cooking-stoves, that the heat imparted to the back rising-flue or flues, as the case may be, connected to the exit-pipe leading to the chimney, is somewhat wasted by being carried out directly into the chimney, and this is also true, to a considerable extent, in relation to the return-flue or flues at the bottom of the stove. I have also found by experiments, that there is a great inequality in the heating of the sides of the oven, and that the back and bottom receive less heat than the front and top-plates. To remedy these defects or evils, by retaining and equally distributing the heat to all parts of the oven, whereby there shall be no considerable waste or inequality in the distributing of the heat for baking, or roasting, or cooking purposes, is the main or leading object of my invention and improvements herein contained and set forth.

The nature of my invention and improvements herein will, therefore, more fully appear in detail, and in all the parts thereof, as I proceed with the description of the construction, arrangement, and combination of the various parts thereof, which is as follows, to wit:

In the accompanying drawings, *a* represents the fire or combustion-chamber in the front upper corner of the stove or oven. *b* represents the oven, the rear part of which is mainly back of the said combustion-chamber *a*, and the part extending under the said fire-chamber, so that the front part of the oven receives heat from the back and from the bottom of the fire-chamber, substantially as described and set forth in the reissue of my said Letters Patent, originally granted and issued as aforesaid, to wit, January 18, 1859. At the back of the oven there are three vertical flues side by side, and it is manifest that there may be but two such flues, to wit, one ascending and one descending, or there may be more than three, as before named, if deemed best so to construct the same.

The side-flues, in the accompanying drawings, *c c*, are diving-flues, and the one in the middle, *d*, is a rising or ascending-flue, and leads directly to the exit-pipe. The heat or non-consumed products of combustion pass directly from the fire-chamber, in a single sheet, over the top of the oven aforesaid, and, dividing, descend through the two flues *c c* at the back, as aforesaid, and at the bottom unite in a single sheet in the flue-space *e*, which extends the entire length of the bottom of the said oven. The space between the bottom plate *f* of the oven aforesaid, and the bottom plate *g* of the stove, is divided by the flue-plate *i*, which I arrange in an incline plane or position, upon any angle or degree which may be deemed expedient, in order to carry out the purposes thereof, hereinafter described and set forth, in the most effective and satisfactory manner, and which, thus arranged, forms the direct flue-sheet flue *e*, and also the return-flue *h*. The aforesaid dividing-flue plate, so arranged upon an incline plane, and known as the incline plate *i*, is somewhat higher at the front end or part thereof than at the rear end, substantially as shown at figs. 2 and 6 of the accompanying drawings, so that the capacity of the flue-space or chamber *e* may be gradually reduced toward the front end of the said oven, thus and thereby concentrating the action of the heat, or escaping heated products of combustion, against the bottom of the oven, as the same are somewhat reduced in the degree of heat in their passage from the fire-chamber, or chamber of combustion, thereto. The upper surface of the said inclined plate is cast with suitable flanches, so as to form dove-tail recesses to hold any suitable earthy cement, which is to be plastered into and over the entire upper surface, to act as a non-conductor, and to prevent the heat from passing through the said plate to the return-flue *h* just below the same, and thereby retain the said heat for directly heating the bottom plate of said oven just above, and the said dividing-flue plate *i* thus constructed may be seen at fig. 4, sheet 2, of the accompanying drawings. If deemed expedient, the said dividing-flue plate *i* may be constructed without such flanches and recesses, and in that event will be constructed with smooth or even surfaces, and of any thickness, form, or shape desirable, in order to carry out successfully the main object or purposes thereof thereby. If both surfaces be constructed smooth or even, as aforesaid, there will be no use for the aforesaid cement, which, in all cases, I much prefer to use in the construction of my cooking-stoves, and yet such dividing-flue plate may be made without such ribs, flanches, recesses, and cement, as aforesaid, if any should prefer so to do. The front part or end of the aforesaid dividing and inclined flue-plate *i* does not extend entirely to the front plate *j* of the said stove, figs. 4 and 6. The centre part or portion of said plate *i*, at the front end thereof, extends forward toward the said stove-plate *j*, as seen at A, figs. 4 and 7, and thus and thereby forms a recess, *h'*, upon each side or front corner of the said inclined and dividing-flue plate *i*, substantially as seen at said figs. 4 and 7, or the said plate may be constructed without such recess *h'* in and upon each front corner thereof, in the manner aforesaid, but may be made substantially as shown at said fig. 7, or the whole plate, at the front end thereof, may be cast or made upon a straight or air-line, or upon a curved line, or upon angle-lines, or in any suitable form or shape; but I prefer to construct the said recesses *h'* as aforesaid, and yet they may be omitted; other parts of the stove being, if necessary, constructed and arranged to correspond to such changes. The said projection of the said dividing and inclined flue-plate *i*, as shown at A, figs. 4 and 7, is for the purpose of carrying or compelling the passing heat as near the front edge of the oven-bottom as possible before it enters the lower or return-flue *h*. The said recesses *h'* are for the purpose of compelling or forcing the heated current toward and near the outer edges of the oven-plate *f*, so as to aid in equalizing the degree of heat in the said plate to all parts thereof. The draught is stronger through such spaces *h'* than at the space *h*, for the reason that such spaces are of greater capacity than said space *h*, and much nearer the centre upright-draught flue *d* leading to the exit-pipe. Nearly the same effect or operation may be attained by suitably constructing each corner in a circular form, or by an angle with straight lines, leaving in either case the centre of said plate *i* projecting outward toward the plate in the front part of the stove, forming the outer front plate aforesaid.

The partition-plates *k k*, which separate the two descending-flues, *c c*, from the rising-flue between them, are made double, with a space between, which may or may not be filled with cement or other non-conducting substance, to prevent the heat in the flues *c c* from passing through to the said rising-flue, and thereby be wasted or prevented from being conducted by the draught under the bottom of the oven. The back oven-plate, directly opposite the said rising-flue *d*, is also made double, with a space between, which may also be filled with cement or other non-conducting material, so that the heat applied to this plate by the heated current passing the descending-flues *c c*, and which is also applied thereto from the said oven, shall not pass through the said rising-flue, and thereby be wasted, but shall be retained in the said oven and oven-plates, for baking and cooking purposes. By the aforesaid system or arrangement of lining, doubling, and cementing between the aforesaid partition, flue, and oven-plates, by some suitable non-conducting substance or material, I am enabled to gather and to hold all the heat generated within the proper flues, spaces, and plates, for a much greater time, so that none of such heat is wasted until it shall have been first directed and used for baking, roasting, and cooking purposes, thereby greatly economizing in the use of fuel for such purposes, while at the same time I construct a cooking-stove that will be much more lasting and durable, while, as I have before stated, I gather up and retain, in proper parts and places of my said stove, all the heated and escaping products of combustion, and turn the same to practical and important use, to wit, great economy in the consumption and use of fuel—a very beneficial item, especially among the poorer classes; and again, such construction of partition-plates, flues, and the like, contributes largely in preventing the overheating of a cooking-stove, and the plates thereof, in the manner substantially as aforesaid.

There is a space or air-chamber, S′, upon each side of my said cooking-stove, directly under the bottom plate of the oven, and at the very outer edge thereof. This chamber may be seen at S′, fig. 5, and it is formed by means of flanches or downward-projecting ribs, cast upon the under side of the oven-bottom plate, which, of course, must extend downward sufficiently to rest, or nearly so, upon that part of the stove-plate below the same. Or such chamber may be constructed in any other suitable manner, and it may be of any capacity desired. It extends the entire length of the stove, upon each edge of the under side of the said oven-plate, and also extends upward on the back plate of the oven, along the edge thereof, in the manner and for the purposes as above described in relation to the bottom plate, and it is formed in substantially the same manner and by the same means. It may also extend entirely across the front end of the oven aforesaid. The said ribs or downward projections *a′ a′*, fig. 5, aforesaid, may also be cast upon that part or plate of the stove directly below the said chambers S′ S′; or it may be made or constructed separate, and placed between the oven-bottom plate and the main plate or stove-plate just below. This space or chamber will permit the said oven-bottom plate to be more evenly heated than by any other known means, for it will prevent the cold air outside of the said stove from acting upon the stove-plate, and thereby upon the heat upon the inside or underneath the oven, and also prevent the said heat from passing through said outside plate of the stove, and thus and thereby be wasted. Now, therefore, it is manifest that the said bottom plate of the oven will be much more evenly heated over its entire surface, and that its outer edges will not become cooled, to any considerable extent, by the action of the outer or cold air, and that heat will pass to and be retained in the said edges of the bottom plate of the oven aforesaid, more evenly than has heretofore been accomplished, and thus, and by means thereof, uniform heat is imparted to the various parts of the oven without waste of heat, it being retained and used as herein described and set forth, and with, as hereinbefore stated, much less consumption of the fuel than otherwise, while baking is done and carried on more evenly. The top-flue, above the oven at the back end, communicates directly with the upper end of the rising-flue *d*, by an aperture or opening, controlled by means of the damper *m*, which, when closed, directs the draught around and about the said oven, *b*, in the manner herein described and set forth; and to prevent the heat from wasting by passing through this damper to the said rising-flue or flues, when the said aperture is closed by means of the same, I make the said damper double, and then fill it with cement or other suitable non-conducting material.

It will here be observed that by means of said spaces or chambers S′ S′, or by means of their equivalents, the oven-plates, and more especially the bottom plate, are more evenly heated for baking purposes, with, at same time, no requirement of more or extra heat, thus enabling baking and the like to be quite evenly and well and thoroughly done upon the bottom part of such things or matters as may be put within such oven for baking, &c., which is a very important matter to all who require the use of a cooking-stove.

The aforesaid inclined and dividing-plate *i*, which, as before stated, forms the direct-flue space or chamber *e*, and at the same time also forms the return-flue *h*, substantially as aforesaid, will cause, compel, and force the heat to remain for a long time under the bottom of the oven; for while it drives the heat upward and against the under side of the oven-bottom plate, it at the same time prevents its too rapid passage over the front part or end thereof into the flue or chamber *h* below, which will also prevent the too rapid passage of the heat into the rising or ascending-flue or flues *d*, by means of the rear end of said plate being lower than the front part or end thereof, as will appear upon inspection of the accompanying drawings, at figs. 2 and 6. The heat above and upon the said inclined plate is always somewhat stronger than in the chamber *h*, below the same. It will, therefore, be seen that by inclining said division-plate *i*, the heat may, and will be, much longer retained underneath the said oven, and within the flues below said oven, and also within the entire stove, than if the said division-flue plate *i* were parallel with the bottom plate of the oven, and also with the bottom plate of the cooking-stove, and by covering the same with some non-conducting material as aforesaid, there will be no waste of heat, but, on the other hand, it will be nearly equally distributed over the entire surface of the oven-bottom plate, whereby the entire stove is more equally or evenly heated, especially so with said bottom plate of said oven.

*r*, figs. 1, 2, 3, 5, and 6, represents what I here denominate a bottom or additional encasement, constructed of tin or other suitable material, which covers and encases the entire bottom of the stove, so as to retain the heat within aforesaid sheet-flue space for baking or cooking purposes, as well as to prevent the escape of the heat into the kitchen or room where said stove is being used during the warm weather or summer months. This casing or encasement may be constructed of any form, shape, or design, in order to correspond to and with the bottom of the stove used, and when used, and the same may there be secured by any convenient and suitable mechanical devices or means which will answer the required purposes of holding the same directly under the said sheet-flue space or chamber *h*, under said dividing and inclined plate *i*, and it may be removed at pleasure, but it will be found of great use and service to retain the same upon the stove, as aforesaid, during all the while the stove remains in use, both in the summer and winter.

The said dividing-flue plate *i* may be arranged upon any incline plane or degree underneath the bottom plate of the oven, in the manner and by the means substantially as herein described and set forth, and, at the same time, carry out the object and purposes for which I constructed and arranged such inclined and dividing-flue plate, and hereinbefore set forth, and said plate may be constructed in any suitable manner which will answer the purposes desired or required, and it may be secured within its proper place by any means deemed best to use for that purpose. The said plate must be properly and securely arranged in the place designed for the same within that part of such cooking-stove.

In the manner and by the means substantially as herein described and set forth, I am enabled not only more perfectly to equalize the heat around the oven, and to every part of the said stove, but also to accomplish this important result without the requirement of any additional fuel that would be required for boiling or cooking purposes, or as would be required for the ordinary use of such stove. It will, therefore, be seen that no heat is wasted, nor is there any waste of fuel in the use of my cooking-stove, containing the improvements herein described and set forth, as well as other and important improvements covered by and contained in other Letters Patent granted and issued to me.

Having thus described the nature, construction, and operation of my said invention and improvements, contained in my original Letters Patent, which bear date April 12, 1859, what I claim as new, and of my said original invention, is—

1. The method or the means, substantially as herein described and set forth, of preventing heat from passing through to the rising-flue, leading to the chimney, by separating it from the back oven-plate, and from the descending-flues, by non-conducting partitions, or the equivalents therefor, and for the purposes herein set forth.

2. I also claim the employment of a double damper, filled in with cement or other equivalent non-conducting material, in combination with the flue above the oven, and with the rising flue leading to the chimney, in the manner substantially as and for the purposes herein described and set forth.

3. I also claim the separating of the direct-sheet flue, under the oven, from the return-sheet flue immediately below the same, by means of the dividing-flue plate *i*, or any equivalent therefor, constructed, arranged, and combined with the said sheet-flues, in the manner, and by the means, and for the purposes substantially as herein described and set forth.

4. I also claim the dividing of the space between the bottom plate of the oven and the bottom plate of the stove, by means of the inclined dividing-flue plate *i*, or any equivalent therefor, in the manner and for the purposes substantially as herein described and set forth.

5. I also claim the employment of the space or chambers S′, in combination with the outer edge of the oven-bottom plate, and with the back-end oven-plate, in the manner and for the purposes substantially as herein described and set forth.

6. I also claim the sheet-flue division-plate *i*, having a recess, *h′*, at each front corner thereof, and the projection A, between such recesses, substantially as and for the purposes herein described and set forth.

7. I also claim the employment of a broad or sheet-flue division-plate, *i*, or any equivalent thereof, in combination with the oven and oven-bottom flues, in the manner and for the purposes substantially as herein described and set forth.

8. I also claim the additional bottom plate or encasement *r*, in combination with the broad sheet-flue *h*, or any equivalent therefor, in the manner and for the purposes substantially as herein described and set forth.

In testimony whereof, I have, on this 28th day of January, A. D. 1868, hereunto set my hand, in the presence of two witnesses, to wit:

PHILO P. STEWART.

Witnesses:

MARCUS P. NORTON,

CHARLES D. KELLUM.